US008163321B1

(12) United States Patent
Roskam et al.

(10) Patent No.: US 8,163,321 B1
(45) Date of Patent: *Apr. 24, 2012

(54) COATED POTATO SUBSTRATES HAVING REDUCED FAT CONTENT

(75) Inventors: Robert O. Roskam, Grand Rapids, MI (US); John F. Stevens, Idaho Falls, ID (US); Joel R. Tinsley, Blackfoot, ID (US); Cheree L. B. Stevens, Idaho Falls, ID (US)

(73) Assignee: Advanced Food Technologies, Inc., Grand Rapids, MI (US)

( * ) Notice: Subject to any disclaimer, the term of this patent is extended or adjusted under 35 U.S.C. 154(b) by 606 days.

This patent is subject to a terminal disclaimer.

(21) Appl. No.: 11/932,390

(22) Filed: Oct. 31, 2007

Related U.S. Application Data

(63) Continuation of application No. 10/754,224, filed on Jan. 9, 2004, now Pat. No. 7,964,231, which is a continuation-in-part of application No. 10/170,964, filed on Jun. 13, 2002, now Pat. No. 7,294,355.

(60) Provisional application No. 60/305,005, filed on Jul. 12, 2001, provisional application No. 60/334,646, filed on Nov. 30, 2001.

(51) Int. Cl.
*A23L 1/216* (2006.01)

(52) U.S. Cl. ........ 426/438; 426/289; 426/293; 426/302; 426/305; 426/637

(58) Field of Classification Search .................... None
See application file for complete search history.

(56) References Cited

U.S. PATENT DOCUMENTS

| | | | |
|---|---|---|---|
| 3,424,591 A | 1/1969 | Gold | |
| 3,597,227 A | 8/1971 | Murray et al. | |
| 3,630,755 A | 12/1971 | Schiffman | |
| 3,723,132 A | 3/1973 | Hodge et al. | |
| 3,751,268 A | 8/1973 | Van Patten et al. | |
| 3,934,046 A * | 1/1976 | Weaver et al. | 426/418 |
| 4,053,650 A | 10/1977 | Chino et al. | |
| 4,066,796 A | 1/1978 | McKee | |
| 4,109,024 A | 8/1978 | Cremer | |
| 4,293,572 A | 10/1981 | Silva et al. | |
| 4,504,502 A | 3/1985 | Earle et al. | |
| 4,504,509 A | 3/1985 | Bell et al. | |
| 4,510,166 A | 4/1985 | Lenchin et al. | |
| 4,520,034 A | 5/1985 | Ishii et al. | |
| 4,551,340 A | 11/1985 | El-Hag et al. | |
| 4,603,054 A | 7/1986 | Schmidt et al. | |
| 4,710,228 A | 12/1987 | Seaborne et al. | |
| 4,790,997 A | 12/1988 | Friedman et al. | |
| 4,792,458 A | 12/1988 | Friedman et al. | |
| 4,828,847 A | 5/1989 | Thompson | |
| 4,913,919 A * | 4/1990 | Cornwell et al. | 426/94 |
| 5,004,616 A | 4/1991 | Shanbhag et al. | |
| 5,035,912 A | 7/1991 | Furcsik et al. | |
| 5,059,435 A | 10/1991 | Sloan et al. | |
| 5,120,562 A | 6/1992 | Furcsik et al. | |
| 5,130,151 A | 7/1992 | Averbach | |
| 5,141,759 A | 8/1992 | Sloan et al. | |
| 5,204,137 A | 4/1993 | Slimak | |
| 5,254,353 A | 10/1993 | Huang et al. | |
| 5,260,076 A | 11/1993 | Furcsik et al. | |
| 5,302,410 A | 4/1994 | Calder et al. | |
| 5,393,552 A | 2/1995 | Busacker et al. | |
| 5,431,944 A | 7/1995 | Melvej | |
| 5,439,697 A | 8/1995 | Gonzalez-Sanz | |
| 5,484,617 A | 1/1996 | Tiffany | |
| 5,492,707 A | 2/1996 | Chalupa et al. | |
| 5,589,213 A * | 12/1996 | Desai et al. | 426/438 |
| 5,622,741 A | 4/1997 | Stubbs et al. | |
| 5,626,893 A | 5/1997 | Reddy | |
| 5,648,110 A | 7/1997 | Wu et al. | |
| 5,750,168 A | 5/1998 | Woerman et al. | |
| 5,753,286 A | 5/1998 | Higgins | |
| 5,849,351 A | 12/1998 | Higgins et al. | |
| 5,885,639 A | 3/1999 | Judkins et al. | |
| 5,897,898 A | 4/1999 | Rogols et al. | |
| 5,922,392 A | 7/1999 | Kelly et al. | |
| 5,928,693 A | 7/1999 | Friedman et al. | |
| 5,965,189 A | 10/1999 | Stevens et al. | |
| 5,976,607 A | 11/1999 | Higgins et al. | |
| 5,988,048 A | 11/1999 | Hunter et al. | |
| 5,997,918 A | 12/1999 | Melvej | |
| 6,022,569 A | 2/2000 | Rogols et al. | |
| 6,080,434 A | 6/2000 | Horn et al. | |

(Continued)

FOREIGN PATENT DOCUMENTS

CA 2101474 7/1993

(Continued)

OTHER PUBLICATIONS

Food Product Design: Applications—"Keeping the Crunch in Breakfast Cereals" Jun. 2001.

(Continued)

*Primary Examiner* — Lien Tran
(74) *Attorney, Agent, or Firm* — Price Heneveld LLP

(57) ABSTRACT

A food product including a potato substrate having less than about 6% moisture content that is at least partially coated with a coating composition having a food starch component is provided. The at least partially coated potato substrate contains at least about 20% less fat content (adjusted to an about 1% product moisture basis) after thermal processing as compared to a substantially similar thermal processed uncoated potato substrate.

20 Claims, No Drawings

U.S. PATENT DOCUMENTS

| | | | |
|---|---|---|---|
| 6,086,928 | A | 7/2000 | Stevens et al. |
| 6,113,957 | A | 9/2000 | Mattinson et al. |
| 6,132,785 | A | 10/2000 | Collinge et al. |
| 6,159,521 | A | 12/2000 | Horn et al. |
| 6,197,363 | B1 | 3/2001 | Walter, Jr. et al. |
| 6,217,921 | B1 | 4/2001 | Lanner et al. |
| 6,265,005 | B1 | 7/2001 | Haverkos et al. |
| 6,288,179 | B1 | 9/2001 | Baur et al. |
| 6,635,294 | B2 | 10/2003 | Keijbets |
| 6,733,809 | B2 | 5/2004 | Zimmerman et al. |
| 6,896,915 | B2 | 5/2005 | Shi et al. |
| 6,899,906 | B2 | 5/2005 | Stevens et al. |
| 7,294,355 | B2 | 11/2007 | Roskam et al. |
| 2002/0001643 | A1 | 1/2002 | Stevens et al. |
| 2002/0058099 | A1 | 5/2002 | Stevens et al. |
| 2002/0119219 | A1 | 8/2002 | Doyle et al. |
| 2003/0044488 | A1 | 3/2003 | Roskam et al. |
| 2004/0071832 | A1 | 4/2004 | Stevens et al. |
| 2004/0071833 | A1 | 4/2004 | Stevens |
| 2004/0096548 | A1 | 5/2004 | Stevens et al. |
| 2004/0146630 | A1 | 7/2004 | Roskam et al. |
| 2005/0079248 | A1 | 4/2005 | Stevens et al. |
| 2005/0202136 | A1 | 9/2005 | Stevens et al. |
| 2008/0050474 | A1 | 2/2008 | Roskam et al. |
| 2009/0098255 | A1 | 4/2009 | Stevens |
| 2009/0098256 | A1 | 4/2009 | Stevens et al. |

FOREIGN PATENT DOCUMENTS

| | | |
|---|---|---|
| WO | 8501188 | 3/1985 |
| WO | 9421143 | 9/1994 |
| WO | 9600011 | 1/1996 |
| WO | 9742827 | 11/1997 |
| WO | 9746106 | 12/1997 |
| WO | 0028828 | 5/2000 |
| WO | 0065932 | 11/2000 |
| WO | 0069287 | 11/2000 |
| WO | 0156393 | 8/2001 |

OTHER PUBLICATIONS

Igoe, Robert, Dictionary of Food Ingredients, Springer-Verlag, 2001, p. 83.

LrdRas.Flour-msg; flour as thickener, Sep. 4-5, 1998, p. 12. http://www.florilegium.org/files/FOOD-BREADS/flour-msg.html.

Prior Art French Fry Batter Formula.

84th AACC Annual Meeting Symposia and Reports, A. Jurgens, J.M. Maagd, and A.J. ten Dam, Oct. 31-Nov. 3, 1999.

Specialty-Corn Types, David V. Glover, Dept. of Agronomy, Purdue University, Oct. 1999.

Capolex B; Specialty Coatings for Snack Foods & Baked Goods, Centerchem, Inc., 1998.

Fennema, Owen (ed.), Food Chemistry Third Edition, Marcel Dekker, Inc. 1996, pp. 201-204.

\* cited by examiner

COATED POTATO SUBSTRATES HAVING REDUCED FAT CONTENT

CROSS-REFERENCE TO RELATED APPLICATIONS

This application, is a continuation of U.S. patent application Ser. No. 10/754,224, filed on Jan. 9, 2004 now U.S. Pat. No. 7,964,231, entitled COATED POTATO SUBSTRATES HAVING REDUCED FAT CONTENT, the disclosure of which is hereby incorporated by reference in its entirety. U.S. patent application Ser. No. 10/754,224, filed on Jan. 9, 2004, is a continuation in-part of U.S. patent application Ser. No. 10/170,964 entitled Snack/Convenience Foods and the Like Having External and/or Internal Coating Compositions filed on Jun. 13, 2002 now U.S. Pat. No. 7,294,355, the disclosure of which is hereby incorporated by reference in its entirety, which claims the benefit of (1) U.S. Provisional Application Ser. No. 60/305,005 filed on Jul. 12, 2001, the disclosure of which is hereby incorporated by reference in its entirety and (2) U.S. Provisional Ser. No. 60/334,646 filed on Nov. 30, 2001, the disclosure of which is hereby incorporated by reference in its entirety.

BACKGROUND OF THE INVENTION

Traditional potato substrates may be thermally processed by frying, frying then subsequently baking, or only baking the potato substrate. When thermally processing includes frying, the potato substrate is typically submerged in heated oil for a period of time. The water within traditional potato substrate is typically composed of both chemically bound water and free water. Chemically bound water is very difficult to remove from a substrate because it is tied tightly to the substrate at the molecular level. However, the free water is less tied to the substrate and is available to exchange with the hot oil in the thermal processor (i.e., food fryer) and increases the total fat content of the potato substrate. This exchange adds oil content to the traditional potato substrate in exchange for water, which is released from within the substrate. This addition of oil to the substrate increases the fat content of the traditional fried potato substrate.

Wet batter slurry coatings are currently used to coat french fries. When coating a french fry with a wet batter slurry the overall potato product fat content increases significantly after final frying. The fat content may be increased as much as from about 5% to as high as about 100% over that of an uncoated french fry potato substrate due to this oil-water exchange. When a french fry is submerged in the heated oil of a typical food fryer the free water from within the french fry exchanges with the hot oil in the fryer significantly increasing the fat content of the french fry. Similarly, water-containing slurry coating compositions, which are often applied to the exterior surface of a french fry substrate prior to thermal processing will typically be absorbed and/or bound to various molecules within the french fry so that when the coated french fry is submerged in an oil fryer the bound water exchanges with the oil in the fryer. These traditional french fry coatings significantly increase the fat content of the french fry.

Efforts have been made to reduce the fat content in traditional potato substrates. One example is low fat baked potato chips. The low fat baked potato chips, while achieving a lower fat content than traditional potato chips, are very dry and flinty in texture. Also, these traditional baked potato chips have a poor mouthfeel and do not taste much like a traditional fried potato chip because they do not contain the fat of traditional potato chips. Additionally, these traditional low fat baked potato chips break very easily during handling, for example, during packaging, distribution, and consumption. Upon opening a bag of traditional low fat baked potato chips, the consumer is generally dissatisfied with the number of broken potato chip pieces, commonly referred to as crumbs.

Applicants have surprisingly discovered a novel and non-obvious wet slurry food coating composition to be applied to the external surface of potato substrates. This food coating is applied to the external surface of the potato substrate prior to thermal processing. Contrary to traditional food coating practices and traditional food coating experimentation results regarding coating a potato substrate with a wet slurry coating composition prior to thermal processing, the present invention, upon thermal processing results in a coated potato substrate having a total fat content of less than about 30% by weight (adjusted to as 1% product moisture basis). These lower-fat coated potato chips retain the texture, taste, and mouthfeel of the traditional higher fat potato chips.

SUMMARY OF THE INVENTION

The present invention generally relates to a potato substrate having less than about 6% moisture content, more typically less than about 3% moisture content that is at least partially coated with a coating composition having a food starch component. The at least partially coated potato substrate comprises at least about 20% less fat content, more typically at least 30% less fat content, (adjusted to a 1% product moisture basis) after thermal processing as compared to a similarly processed, uncoated potato substrate.

These and other features, advantages, and objects of the present invention will be further understood and appreciated by those skilled in the art by reference to the following specification and claims.

DETAILED DESCRIPTION OF PREFERRED EMBODIMENT

The coating of the potato substrate of the present invention is applied to the exterior surface of a potato substrate. The coated potato substrate is then thermally processed resulting in a coated potato substrate having a reduced fat content and the taste and mouth-feel of traditional potato substrates.

The potato substrate may be any variety of potato, including but not limited to, Russet, Yukon Gold, round white and/or red potatoes. The potato substrates of the present invention generally have less than about 6% moisture content, more typically less than about 3% moisture content, and are usually selected from what is termed as chipping stock potatoes. Chipping stock potatoes tend to be much more spherical than the potatoes used for either french fry production or table stock (home baking use). The reduced moisture substrates help prevent migration of oil upon thermal processing to the substrate thereby facilitating fat reduction of the thermally processed substrate. While the present invention is not limited to any specific shape or size potato substrate, typically the potato substrate is cut to a shape and size similar to that of a traditional potato chip. Most typically the potato substrate is cut to a thickness of from about 0.020 inches to about from 0.070 inches to about 0.080 inches, but more typically are cut to a thickness of about 0.030 inches to about 0.070 inches and most typically are cut to from about 0.040 inches to about 0.060 inches. The potato substrate may be cut and/or shaped to have an exterior surface similar to a traditional potato chip; for example, the cut potato substrate may have an exterior surface including, but not limited to, a smooth, a wavy and/or a ridged exterior surface.

The coating composition generally contains, among other ingredients, one or more either modified or unmodified food starch components including, but not limited to, a potato starch, a corn starch, a wheat starch, a tapioca starch, a rice starch, a pea starch, and a *cassava* starch, or mixtures thereof. Typically, the coating composition includes a potato starch or a corn starch and most typically includes a potato starch and a corn starch.

The coating composition is typically applied to the surface of the potato substrate in the form of a wet slurry but conceivably may also be in a dry coating form. Once the coating composition is applied to the external surface of the potato substrate, and typically covers at least a portion thereof. More typically, a substantial portion of the external surface of the potato substrate is coated.

The wet slurry coating composition of the present invention is typically applied to the potato substrate before the potato substrate has been thermally processed. The wet slurry coating composition usually contains from about 10% to about 60% solids content, more typically from about 20% to about 60%, and most typically about 40% solids content. When the wet batter slurry coating composition of the present invention contains about 40% solids concentration, the remainder of the slurry coating composition is substantially water, with the possible exception of minor amounts of fillers, colorants or other additives. The wet batter slurry coating composition is then applied to the external surface of the potato substrate.

Once the coating composition has been applied, the substrate is subsequently thermally processed to provide a coated potato chip having a reduced fat content. When the coated potato substrate is initially subjected to thermal processing, it is presently believed that the wet slurry forms a matrix on the exterior of the potato substrate. This matrix essentially creates a gridlock and at least partially insulates the potato substrate from absorbing oil (i.e., fat). The wet batter slurry coating composition of the present invention is typically thin and sets quickly when exposed to the heat utilized in thermal processing. This matrix formation and the blocking of oil absorption effect is due largely to flashing. Flashing is typically the exodus of free water from a substrate upon being subjected to a sudden and substantial increase in the environmental temperature. The water contained in the wet batter slurry coating composition is generally unbound free water. When the slurry coating composition is applied to the external surface of the potato substrate and subsequently thermally processed, the unbound water evaporates from the coating composition and flashes off the oil (i.e., fat) from absorbing to the coated potato substrate. This flashing occurs during the time it takes the matrix of the coating composition to set. The time it takes for the coating composition to set and form a matrix on the exterior coating of the potato substrate is typically from about 5 seconds to about 20 seconds and more typically from about 10 seconds to about 15 seconds. Additionally, coated potato substrates of the present invention are thermally processed, typically fried at a temperature of from about 300° F. to about 400° F., for from about 1 second to about 90 seconds or about 10 to about 30 seconds longer than uncoated potato substrates to achieve the about 6% or less moisture content of the potato substrate, more typically less than about 3% moisture content of the potato substrate. The potato substrate may be parfried and subsequently baked.

This reduction in oil (i.e., fat) results in a coated potato chip having a reduced fat content while maintaining the desirable characteristics of traditional potato chips, including, but not limited to, taste, mouthfeel, texture and strength. The resulting thermally processed coated potato chip also has a much greater crispness and the coating composition provides enhanced tensile strength to the coated potato substrate thereby increasing their resistance to breakage as compared to uncoated potato chips. The coated and thermally processed potato chip of the present invention has an increased shelf-life, and is less oily in both appearance and touch as compared to traditional potato chips.

The coating composition applied to the external surface of the potato chips of the present invention is typically a clear coating composition and accordingly is substantially invisible to the consumer. As such, the coating composition will not detract from the appearance of the coated potato chip. Additionally, the coating composition retards staling of the potato chip, allows one to tailor the amount of crispness desired (by adjusting the wet batter solids content of the coating composition), and produces a less mottled substrate appearance and a more even substrate coloring as compared to traditional potato chips. The coating compositions of the potato substrates of the present invention are generally non-allergenic and typically produce an even distribution of seasonings, particulates and colors on the exterior surface of the potato substrate.

Various other optional ingredients such as a colorant(s) or sweetener(s) may be added to the coating composition, but are generally not desired and, therefore, a colorant is not typically included in the formula of the present invention. If a colorant is used, any water dispersible food colorant or combination of food colorants may be used, including caramel.

The following examples more precisely and particularly illustrate the specific details of the potato substrate of the present invention. Equivalent procedures and quantities will occur to those skilled in the art and, therefore, the following examples are not meant to define the limits of the present invention, these being defined by the scope of the appended claims. Coating compositions are typically applied to the external surface of the potato substrate in substantially the same manner as disclosed herein, but conceivably could also be applied as a dry dusting coating composition.

Coating Composition for Potato Substrates

The object of this example was to prepare a coated reduced fat potato substrate in a laboratory environment, wherein the coating composition, when applied to the external surface of a potato substrate, was not visible but provides more resistance to breakage, greater crispness, fat reduction, retards staling, provides increased tensile strength, and increase the shelf-life of the coated potato substrate.

Example 1

Coating Composition Including at Least One Potato Starch, at Least One Corn Starch, Dextrin and Other Ingredients The generally preferred coating composition of the present invention typically includes a modified potato starch, a modified corn starch, a high amylose corn starch, a dextrin, an oil, a leavening agent and a stabilizer. The potato starch component may be a modified potato starch such as an oxidized, substituted, and/or crosslinked potato starch. Typically, the potato starch used in the coating composition applied to the external surface of potato substrates is ungelatinized and crosslinked potato starch. The coating composition of this example is applied to the external surface of a potato substrate in the form of a wet slurry.

The modified (chemically and/or physically) potato starch is typically present in the coating composition in an amount of from about 10% to about 90% by weight of the coating composition, more typically from about 20% to about 80%, and most typically at about 72%. The modified potato starch primarily provides crispness to the coated composition. It is presently believed that any starch may be utilized in the coating composition of the present invention including corn starch, potato starch, tapioca starch, wheat starch or a mixture thereof, but potato starch, as discussed above, is generally most preferred.

This embodiment of the present invention also typically includes at least one modified corn starch. The corn starch may be modified by any industrially acceptable means; however, oxidation is the most typical modification. The oxidized corn starch is typically present in the coating composition from about 1% to about 30% by weight of the coating composition, more typically from about 5% to about 25%, and most typically at about 13.4%. The oxidized corn starch is typically included in the composition as an adhesive component. An oxidized corn starch suitable for use in the present embodiment of the invention includes BATTERBIND® S available from National Starch and Chemical Co., of Bridgewater, N.J.

The coating composition of this embodiment may also include at least one unmodified high amylose corn starch. One unmodified high amylose corn starch suitable for use in this embodiment of the present invention includes HYLON® VII, available from National Starch and Chemical Co., of Bridgewater, N.J. This specific unmodified corn starch is typically a high amylose corn starch containing at least approximately 70% amylose. The unmodified high amylose corn starch is typically present in the coating composition from about 1% to about 30% by weight of the coating composition, more typically from about 5% to about 20%, and most typically at about 9.1%.

The coating composition of this embodiment also typically includes at least one dextrin component. The dextrin utilized may include, but is not limited to, corn dextrin, tapioca dextrin, potato dextrin, or other commercially available food dextrins known to those skilled in the art; however, corn dextrin is most typically used. The corn dextrin is believed to provide superior film-forming functionality to the coating composition as well as crispness and tensile strength. While any corn dextrin may be used, one source of corn dextrin is CERESTAR 07702 corn dextrin available from Cargill of Minneapolis, Minn. The dextrin utilized in this embodiment is typically present in the amount of from about 1% to about 20% by weight of the coating composition, more typically from about 3% to about 15%, and most typically at about 4.9%.

The coating composition of this embodiment may also contain an edible oil. The edible oil utilized may include, but is not limited to, soybean oil, corn oil, or other commercially available food oils known to those skilled in the art; however, all-purpose soybean oil is most typically used because of availability and economics. The edible oil utilized is typically present at from about 0.01% to about 5% by weight of the coating composition, more typically from about 0.1% to about 2%, and most typically at about 0.2%. It is presently believed that any commercially known food grade oil may be utilized in this embodiment of the present invention.

The coating composition of this embodiment may also contain at least one leavening agent. The leavening agent(s) provides chemical leavening that results in a light tender texture and increases the crispness of the exterior of the coated processed potato substrate. The leavening agent may include a leavening agent including, but not limited to, monocalcium phosphate monohydrate or other commercially available food leavening agents known to those skilled in the art. The leavening agent may also include a leavening system. However, monocalcium phosphate monohydrate is most typically used. The leavening agent utilized is typically present from about 0.01% to about 5% by weight of the coating composition, more typically from about 0.1% to about 2%, and most typically at about 0.2%.

The coating composition of the present invention may also include at least one gum or similar natural or synthetic stabilizers, including, but not limited to, xanthan gum, guar gum, CMC (carboxymethylcellulose) or mixtures thereof. More typically, the coating composition includes a xanthan gum. The stabilizer may be present in the coating composition in the amount of from about 0.01% to about 5% by weight of the coating composition, more typically from about 0.1% to about 2%, and most typically at about 0.2%.

Application Processes for Applying the Coating Composition of the Previous Examples The process for applying the coating composition of the embodiments of the present invention to the surface of a potato piece may be achieved by any known method for applying a slurry coating composition to a food substrate, including but not limited to, spray coating, dunk/drip bath, or by a waterfall application process.

Application Process for Applying 40% Wet Batter Solids Concentration Slurry to Potato Slices and Frying In the following example, potatoes were peeled and cut to a thickness of approximately about 0.050 inches to about 0.060 inches. The cut potatoes were then placed in a bucket of cold water to rinse off any free starch (this step is typically done, but not required). The potato slices were then removed from the bucket of cold water and approximately 10 slices of cut potatoes were dewatered (only necessary if free starch is rinsed). The potato slices were coated by dipping the raw cut, rinsed, and dewatered slices into an about 40% wet hatter solids slurry containing the ingredients and corresponding percentages listed in Table 1.

TABLE 1

| Ingredient | Percentage of Formula |
|---|---|
| Modified potato starch | 72% |
| Modified corn starch | 13.4% |
| High amylose corn starch | 91% |
| Corn dextrin | 4.9% |
| Soybean oil (anti-dust agent) | 0.2% |
| Monocalcium phosphate monohydrate (flow agent) | 0.2% |
| Xanthan gum (stabilizer) | 0.2% |

The excess wet batter slurry was removed from the slices by pouring the slices onto a screen thereby allowing the batter to drip off the coated slices. The coated slices were then placed into a fry basket and fried in oil at a temperature of approximately 365° F. for from about 30 to about 40 seconds. After frying for from about 30 to about 40 seconds, the chips (fried/thermally processed potato slices) begin to float. Therefore a second wire basket is placed over the partially fried chips to keep the chips submerged in the hot oil and the frying process is continued for a total frying process time of approximately 100 seconds (i.e., until the chips substantially stop bubbling).

The viscosity of the wet slurry coating composition used may be determined by using a Zahn #2 cup (Signature Series). When using a Zahn #2 cup (Signature Series) to determine the viscosity, the wet slurry coating composition is at a temperature of from about 35° F. to about 100° F., more typically at about 65° F. Generally, the viscosity of the wet slurry coating composition, as measured by using the Zahn #2 cup (Signature Series) is from about 10 seconds to about 60 seconds, more typically from about 25 seconds to about 45 seconds, and most typically at about 35 seconds.

The wet slurry viscosity is typically measured by the industry Zahn #2 cup (Signature Series) testing procedures outlined below:

a. Completely fill to clean, dry Zahn #2 cup (Signature Series) with slurry (using a fingertip to act as a stopper to prevent the slurry from draining out the bottom of the cuphole);

b. Use other hand to hang onto the wire handle of the Zahn #2 cup (Signature Series) and to hold a stopwatch;

c. Start the stopwatch when the fingertip is removed from the Zahn #2 cup (Signature Series) and stop the stopwatch when the slurry stream passing through the bottom cuphole first breaks a continuous stream;

d. Record the time in seconds; and e. Repeat this procedure two additional times. Calculate the average of the three determinations and record.

The viscosity of the wet slurry coating composition as measured by using the Zahn #2 cup (Signature Series) was approximately 35.23 seconds and approximately 35.29 seconds. The average Zahn #2 cup (Signature Series) viscosity was 35.26 seconds.

The pickup percentage of the coating composition by the potato pieces was measured and recorded. The percentage pickup measures the amount of slurry coating composition that does not fall off the potato pieces after application. The wet slurry coating pickup percentage is typically calculated according to the following formula: ((wet weight of coated potato slices−uncoated weight of potato slices)÷uncoated weight of potato slices)×100. The wet batter pickup concentration for this example is listed in Table 2.

TABLE 2

| Chip Diameter Size | Uncoated Slice Weight | Coated Weight | Percentage Pickup |
|---|---|---|---|
| Large (about 4 in.) | 44.60 g | 67.55 g | 51.2% |
| Medium (about 3 in.) | 45.13 g | 63.10 g | 39.8% |
| Small (less than about 2 in.) | 31.37 g | 42.44 g | 35.3% |

The experiment showed that these coated and processed chips have significantly less fat than an uncoated potato chip undergoing the same processing conditions. An approximately 31% final fat content reduction compared to the similarly processed uncoated potato chip is typically achieved.

Application Process for Applying a 35% Wet Batter Solids Concentration Slurry to Potato Slices and Frying In the following example, chipping potatoes were peeled, cut to a thickness of approximately about 0.050 inches to about 0.060 inches and placed in a bucket of cold water to rinse off any free starch (this step is typically done, but not required). The potato slices were then removed from the water and dewatered (only necessary if free starch is rinsed).

The potato slices were coated by dipping the raw cut, rinsed, and dewatered slices into an about 35% wet batter solids slurry containing the ingredients and corresponding percentages listed in Table 1.

The excess wet batter solids slurry was removed from the slices by pouring the slices onto a screen allowing the remaining slurry to drip off the coated potato slices. The coated potato slices were then placed into a fry basket and fried at a temperature of approximately 365° F. for from about 30 to about 40 seconds. After frying for from about 30 to about 40 seconds, the chips (fried/thermally processed potato slices) began to float. Therefore, a second wire basket is placed over the partially fried chips to keep them submerged in the hot oil and the frying process is continued for a total fry time of approximately from about 95 seconds to about 100 seconds (i.e., until the chips substantially stop bubbling).

The viscosity of the 35% wet slurry coating composition used may be determined by using a Zahn #2 cup (Signature Series). When using a Zahn #2 cup (Signature Series) to determine the viscosity, the wet slurry coating composition is at a temperature of from about 35° F. to about 100° F., more typically at about 65° F. In this example, the viscosity of the wet slurry coating composition was approximately 24.27 seconds, 24.07 seconds and 24.02 seconds. The average viscosity as measured by a Zahn #2 cup (Signature Series) was approximately 24.12 seconds.

The percentage pickup of the coating composition by the medium potato slices was measured and recorded. The percentage pickup for this example is shown in Table 3 below.

TABLE 3

| Uncoated Slice Weight | Coated Weight | Percentage Pickup |
|---|---|---|
| 43.39 g | 56.41 g | 30.0% |
| 47.59 g | 62.36 g | 31.1% |

The percentage pickup measures the amount of slurry coating composition that does not fall off the potato pieces after application and is determined via the calculation provided above. The experiment showed that these coated and processed chips have significantly less fat than an uncoated potato chip undergoing the same processing conditions. An approximately 31% final fat content reduction compared to the similarly processed uncoated potato chip is typically achieved.

Application Process for Applying a 40% Wet Batter Solids Concentration Slurry to Potato Slices, Parfrying, and Baking In the following example, potatoes were peeled, cut to a thickness of approximately about 0.050 inches to about 0.060 inches, rinsed, and dewatered. The potato slices were rinsed by placing the raw cut potato slices into clean ambient water. The potato slices were dewatered by taking approximately 10 individual cut potato slices from the ambient rinse water, placing them on a paper towel and then squeezing the excess water out of the potato slices.

The potato slices were coated by dipping the raw cut, rinsed, and dewatered slices, utilizing the same rinsing and dewatering process as described above, into an about 40% wet batter solids slurry containing the ingredients and corresponding percentages listed in Table 1.

The viscosity of the wet slurry coating composition may be determined by using a Zahn #2 cup (Signature Series), When using a Zahn #2 cup (Signature Series) to determine the viscosity, the wet slurry coating composition is at a temperature of from about 35° F. to about 100° F., more typically at about 65° F. Generally, the viscosity of the wet slurry coating composition, as measured by using the Zahn #2 cup (Signature Series) is from about 10 seconds to about 60 seconds, more typically from about 25 seconds to about 45 seconds, and most typically at about 35 seconds.

Typically, the coating composition temperature as applied to the external surface of the potato substrates for this embodiment is from about 35° F. to about 100° F. The pickup percentage of the coating composition is typically from about 10% to about 70%, more typically from about 20% to about 60%, and most typically from about 40% to about 50%.

The coated potato pieces were then fried in soybean oil at a temperature of from about 300° F. to 400° F., more typically 375° F. for from about 1 second to about 90 seconds, more typically about 90 seconds (until the soybean oil bubbling subsided). The pickup percentage of the coating composition by the potato pieces was measured and recorded. The percentage pickup measures the amount of slurry coating composition that does not fall off the potato pieces after application. The wet slurry coating pickup percentage is typically calculated according to the following formula: ((wet weight of coated potato pieces−dry weight of potato pieces)÷dry weight of potato pieces)×100. The wet batter pickup concentration was about 54%.

A separate batch of coated potato chips were also made. The potato chips were coated by dipping the raw cut, rinsed, and dewatered chips, utilizing the same rinsing and dewatering process as described above, into a 40% wet batter solids slurry containing the ingredients and corresponding percentages listed in Table 1.

The coated potato chips were parfried in soybean oil at a temperature of about 375° F. for approximately 30 seconds to set the coating composition on the surface of the potato chip. The parfried potato chips were then placed onto a wire rack and baked in a convection oven at a temperature of about 300° F. for about 10 minutes. The baking step may be at a temperature of from about 100° F. to about 400° F. for from about 2 minutes to about 30 minutes. The wet batter pickup percentage of these chips was about 54%.

Applicants presently believe that a 40% wet batter solids slurry content gives the greatest level of invention benefits while still remaining invisible to the eye on the surface of the potato chip. However, wet batter solids concentrations of from about 30% to about 50% also resulted in coated potato substrates having a reduced fat content and the taste of traditional uncoated potato chips.

The results from the above example are as follows:
1. Conventionally prepared potato chips without a coating composition resulted in 39.2% final fat (adjusted to a 1% moisture basis).
2. The coated and fried potato chips resulted in 27% final fat (adjusted to a 1% product moisture basis) which represented a 31% reduction in fat compared to the conventionally processed potato chips in 1 above.
3. The coated, then parfried and baked potato chips resulted in 23.3% final fat (adjusted to a 1% product moisture basis) which represented a 40.7% reduction in fat compared to the conventionally processed potato chips in 1 above.
4. Parfrying conventionally prepared potato chips without a coating composition and subsequently baking it in a convection oven as done in 3 above resulted in 34.6% final fat (adjusted to a 1% product moisture basis) which represented an 11.9% reduction in fat compared to the conventionally processed potato chips in 1 above. This experiment variable showed that a conventional potato chip can be reduced somewhat in fat content by about 11% to about 12% when using a conventional oven, but still contains significantly more fat than does a coated potato chip that undergoes the same processing conditions that reduces final fat by 40.7% when compared to the conventionally processed potato chips in 1 above.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A method of making a potato chip product comprising:
    providing a potato chip substrate and a coating composition comprising an unmodified food starch component, at least one chemically modified food starch component, and a dextrin;
    at least partially coating the potato chip substrate with the coating composition; and
    thermally processing the coated potato chip substrate until the potato chip substrate comprises less than about 6% moisture content, thereby forming a potato chip comprising at least about 20% less fat, adjusted to a 1% product moisture basis, than a substantially similar thermally processed uncoated potato substrate, wherein the thermal processing is chosen from a group consisting of (1) frying and (2) parfrying and then subsequently baking the potato chip substrate.

2. The method of making a potato chip product of claim 1, wherein the coating composition is a dry dusting coating composition, the potato chip substrate comprises a thickness of from about 0.020 inches to about 0.080 inches, and the step of at least partially coating the potato chip substrate with the coating composition comprises dusting the dry dusting composition onto the potato chip substrate.

3. The method of making a potato chip product of claim 2, wherein the potato chip substrate comprises less than about 3% moisture content.

4. The method of making a potato chip product of claim 2, wherein the at least one chemically modified food starch component is chosen from the group consisting of a chemically modified potato starch, a chemically modified corn starch, a chemically modified wheat starch, a chemically modified tapioca starch, a chemically modified rice starch, a chemically modified pea starch, and a chemically modified *cassava* starch, or mixtures thereof.

5. The method of making a potato chip product of claim 1, wherein the step of frying the potato chip comprises at least partially submerging the potato chip in oil at a temperature from about 300° F. to about 400° F. and wherein the modified food starch component in an ungelatinized and cross-linked potato starch.

6. The method of making a potato chip product of claim 5, wherein the step of frying the potato chip comprises at least partially submerging the potato chip in oil at a temperature from about 300° F. to about 400° F. for a duration of from about 1 second to about 90 seconds.

7. The method of making a potato chip product of claim 5, wherein the step of parfrying and then subsequently baking the potato chip substrate comprises at least partially submerging the potato chip in oil at a temperature from about 300° F. to about 400° F. for a duration of from about 1 second to about 90 seconds and baking the potato chip substrate at a temperature of from about 100° F. to about 400° F. for a duration of from about 2 minutes to about 30 minutes.

8. A method of making a potato chip product comprising:
    providing a potato chip substrate and a coating composition comprising:
        a chemically modified food starch;
        an unmodified food starch;

a dextrin;

an edible oil;

a leavening agent; and at least one gum or stabilizer;

applying the coating composition to a least a portion of an external surface of the potato chip substrate; and thermally processing the coated potato chip substrate until the potato chip substrate comprises less than about 3% moisture, thereby forming a potato chip comprising at least about 30% less fat, adjusted to a 1% product moisture basis, than a substantially similar thermally processed uncoated potato chip produced from an uncoated potato chip substrate; and wherein the thermal processing is chosen from a group consisting of (1) frying and (2) parfrying and then subsequently baking the potato chip substrate.

9. The method of making a potato chip product of claim 8, wherein the potato chip substrate comprises a thickness of from about 0.020 inches to about 0.080 inches.

10. The method of making a potato chip product of claim 9, wherein the coating composition comprises a dry dust composition when applied to the external surface of the potato chip substrate.

11. The method of making a potato chip product of claim 8, wherein the modified food starch is an ungelatinized and cross-linked potato starch, the unmodified food starch is an unmodified corn starch having an amylose content of at least about 70% amylose, the dextrin is a corn dextrin, and the coating composition further comprises an oxidized corn starch and wherein the ungelatinized and cross-linked potato starch comprises from about 10% to about 90% by weight of the coating composition, the unmodified corn starch comprises from about 1% to about 30% by weight of the coating composition, the corn dextrin comprises from about 1% to about 20% by weight of the coating composition, and the oxidized corn starch comprises from about 1% to about 30% by weight of the coating composition.

12. The method of making a potato chip product of claim 8, wherein the coating composition is substantially invisible to a consumer.

13. The method of making a potato chip product of claim 9, wherein the coating composition is substantially invisible to a consumer.

14. The method of making a potato chip product of claim 10, wherein the coating composition is substantially invisible to a consumer.

15. The method of making a potato chip product of claim 8, wherein the thermal processing step consists of frying and the step of frying the potato chip comprises at least partially submerging the potato chip in oil at a temperature from about 300° F. to about 400° F. for a duration of from about 1 second to about 90 seconds.

16. The method of making a potato chip product of claim 15, wherein the coating composition is substantially invisible to a consumer.

17. The method of making a potato chip product of claim 8, wherein the thermal processing step consists of parfrying and then subsequently baking the potato substrate and the step of parfrying and then subsequently baking the potato chip substrate comprises at least partially submerging the potato chip in oil at a temperature from about 300° F. to about 400° F. for a duration of from about 1 second to about 90 seconds and baking the potato chip substrate at a temperature of from about 100° F. to about 400° F. for a duration of from about 2 minutes to about 30 minutes.

18. A method of making a potato chip product comprising:
providing a potato chip substrate comprising a thickness of from about 0.020 inches to about 0.080 inches and a coating composition comprising a chemically modified potato starch in an amount of from about 10% to about 90% by weight of the coating composition, an unmodified starch component and a dextrin;

at least partially coating an external surface of the potato chip substrate with the coating composition;

removing excess coating composition from the potato chip substrate; and thermally processing the coated potato chip substrate to form a thermally processed potato chip having a moisture content of less than about 6%, wherein the thermal processing is chosen from a group consisting of (1) frying in oil at a temperature of from about 300° F. to about 400° F. for at least 20 seconds and (2) parfrying in oil at a temperature of from about 100° F. to about 400° F. for at least 10 seconds and then baking in a convection oven at a temperature of from about for at least 2 minutes.

19. The method of making a potato chip product of claim 18, wherein the chemically modified potato starch is an ungelatinized and cross-linked potato starch.

20. The method of making a potato chip product of claim 18, wherein the chemically modified potato starch comprises an ungelatinized and cross-linked potato starch in an amount of from about 20% to about 80% by weight of the coating composition.

* * * * *

UNITED STATES PATENT AND TRADEMARK OFFICE
CERTIFICATE OF CORRECTION

PATENT NO. : 8,163,321 B1  Page 1 of 1
APPLICATION NO. : 11/932390
DATED : April 24, 2012
INVENTOR(S) : Robert O. Roskam et al.

It is certified that error appears in the above-identified patent and that said Letters Patent is hereby corrected as shown below:

In the Specifications

Column 1, line 13, "continuation in-part" should be --continuation-in-part--;

Column 1, line 21, "Provisional Ser." should be --Provisional Application Ser.--;

Column 2, line 43, "mouth-feel" should be --mouthfeel--;

Column 3, lines 11-12, "Once the coating composition" should be --The coating composition--;

Column 4, line 48, "increase" should be --increases--;

Column 6, line 50, "91%" should be --9.1%--;

Column 6, line 62, "begin" should be --began--;

Column 9, line 22, "were" should be --was--;

In the Claims

Column 10, claim 5, line 48, "in" should be "is";

Column 12, claim 18, line 37, "from about for at least" should be --of from about 100°F to about 400°F for at least--.

Signed and Sealed this
Twenty-fourth Day of December, 2013

Margaret A. Focarino
*Commissioner for Patents of the United States Patent and Trademark Office*